(12) United States Patent
Takahashi et al.

(10) Patent No.: US 12,148,911 B2
(45) Date of Patent: Nov. 19, 2024

(54) HEAT TRANSFER SUPPRESSION SHEET AND BATTERY PACK

(71) Applicant: Ibiden Co., Ltd., Ogaki (JP)

(72) Inventors: Naoki Takahashi, Ogaki (JP); Hisashi Ando, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 185 days.

(21) Appl. No.: 17/635,783

(22) PCT Filed: Jul. 5, 2021

(86) PCT No.: PCT/JP2021/025377
§ 371 (c)(1),
(2) Date: Feb. 16, 2022

(87) PCT Pub. No.: WO2022/009851
PCT Pub. Date: Jan. 13, 2022

(65) Prior Publication Data
US 2023/0118928 A1     Apr. 20, 2023

(30) Foreign Application Priority Data

Jul. 10, 2020   (JP) ................................ 2020-119429

(51) Int. Cl.
*H01M 10/658*   (2014.01)
*H01M 10/613*   (2014.01)

(52) U.S. Cl.
CPC ....... *H01M 10/658* (2015.04); *H01M 10/613* (2015.04)

(58) Field of Classification Search
None
See application file for complete search history.

(56) References Cited

U.S. PATENT DOCUMENTS

| | | | | |
|---|---|---|---|---|
| 4,265,775 A * | 5/1981 | Aakalu | ................ | C09K 5/08 252/75 |
| 2014/0186599 A1 | 7/2014 | Fukui et al. | | |

(Continued)

FOREIGN PATENT DOCUMENTS

| | | |
|---|---|---|
| CN | 103781954 A | 5/2014 |
| CN | 109642697 A | 4/2019 |

(Continued)

OTHER PUBLICATIONS

International Search Report (PCT/ISA/210) dated Sep. 28, 2021 issued by the International Searching Authority in International Application No. PCT/JP2021/025377.

(Continued)

*Primary Examiner* — Wyatt P McConnell
(74) *Attorney, Agent, or Firm* — Sughrue Mion, PLLC (57) ABSTRACT

Provided are a heat transfer suppression sheet having an excellent heat transfer prevention effect and excellent retainability of inorganic particles and shape retainability at a high temperature, and a battery pack in which the heat transfer suppression sheet is interposed between battery cells. The heat transfer suppression sheet (10) includes inorganic particles (20), first inorganic fibers (30), and second inorganic fibers (31). An average fiber diameter of the first inorganic fibers (30) is larger than an average fiber diameter of the second inorganic fibers (31). The first inorganic fibers (30) have a linear shape or a needle shape, and the second inorganic fibers (31) have a dendritic shape or a crimped shape.

20 Claims, 3 Drawing Sheets

(56) References Cited

U.S. PATENT DOCUMENTS

| | | |
|---|---|---|
| 2015/0377407 A1 | 12/2015 | Shinoki et al. |
| 2019/0178434 A1 | 6/2019 | Sakatani et al. |
| 2019/0190098 A1 | 6/2019 | Abe |
| 2019/0329525 A1 | 10/2019 | Nonaka et al. |
| 2020/0141300 A1 | 5/2020 | Dietz |

FOREIGN PATENT DOCUMENTS

| | | | |
|---|---|---|---|
| JP | 11-35381 | A | 2/1999 |
| JP | 2010-106381 | A | 5/2010 |
| JP | 2010-155733 | A | 7/2010 |
| JP | 2010-156065 | A | 7/2010 |
| JP | 2012-7247 | A | 1/2012 |
| JP | 201371848 | A | 4/2013 |
| JP | 2013-170338 | A | 9/2013 |
| JP | 2013-234410 | A | 11/2013 |
| JP | 2016-71376 | A | 5/2016 |
| JP | 2018206605 | A | 12/2018 |
| JP | 202072004 | A | 5/2020 |
| JP | 2021-531631 | A | 11/2021 |
| JP | 6997263 | B1 | 1/2022 |
| JP | 7000626 | B1 | 1/2022 |
| WO | 2013121992 | A1 | 8/2013 |
| WO | 2014162771 | A1 | 10/2014 |
| WO | 2018092888 | A1 | 5/2018 |
| WO | 2018110055 | A1 | 6/2018 |
| WO | 2018211906 | A1 | 11/2018 |
| WO | 2019/187313 | A1 | 10/2019 |
| WO | 2019/225643 | A1 | 11/2019 |
| WO | 2020/023357 | A1 | 1/2020 |
| WO | 2020/129274 | A1 | 6/2020 |

OTHER PUBLICATIONS

Written Opinion (PCT/ISA/237) dated Sep. 28, 2021 issued by the International Searching Authority in International Application No. PCT/JP2021/025377.
Recent Trend of Functional Clay Materials, Popular Edition, Jun. 8, 2016, p. 16, pp. 20-27 (total 10 pages).
Shirasu balloon, Maarlite®, Website, Marunakahakudo Inc., Jun. 20, 2022, http:www.marunakahakudo.co.jp/balloon/index.html (total 5 pages).
Catalog of High-Performance Additive Agent, 3M Japan Limited, p. 9, published on 2019 (total 4 pages).
New Textile General Dictionary, Senken Shimbun Co., Ltd., Feb. 1, 2012, pp. 149-150, p. 227 (total 10 pages).
Summary of Artificial Mineral Fibers, NICHIAS Technical Report, Jul. 1, 2018, vol. 3 No. 382, pp. 12-17 (total 11 pages).
Basic Knowledge of Technical Fiber and Textiles, Jan. 28, 2011, p. 143 (total 5 pages).
Encyclopaedia, Chimica 6, Dec. 15, 1963, pp. 696-697 (total 9 pages).
Powder Technology Handbook, Feb. 25, 2014, p. 663 (total 6 pages).
Product and Application of High-Purity Silica, Sep. 13, 1999, p. 265 (total 6 pages).
Characteristics and Applications of Gel method Silica, TOSOH Research & Technology Review, vol. 45 (2001), pp. 65-69 (total 10 pages).
Information Sheet for Nanomaterial, Amorphous Silica Colloidal Particles, Nissan Chemical Corporation, Jun. 2018 (total 17 pages).
Product Catalog Nippon Aerosil® Co., Ltd., vol. 10, Feb. 1990 (total 12 pages).

Silica Aerogel Composites, 2016, p. 18, p. 44, p. 99 (total 6 pages).
Terminology Dictionary of Powder Technology, 2nd Edition, Mar. 30, 2000, pp. 375-377 (total 9 pages).
Powder Technology Handbook, Feb. 25, 2014, pp. 7-8, pp. 26-27, pp. 31-33, p. 39, p. 70 (total 13 pages).
The Story of Nanoparticles, Dec. 30, 2006, p. 90 (total 5 pages).
Precise Knowledge, How to Prepare and Use Particle Dispersed Liquid, Nov. 25, 2016, pp. 7-8, pp. 12-13 (total 8 pages).
NICHIAS Technical Report, vol. 4, No. 395, Oct. 8, 2021, pp. 14-17 (total 9 pages).
Terminology of Kimono, Crimp Staple, Sep. 21, 1992, http://www.so-bien.com/kimono/%E7%94%A8%E8%AA%9E/%E6%8D%B2%E7%B8%AE%E3%82%B9%E3%83%86%E3%83%BC%E3%83%97%E3%83%AB.html#more (total 2 pages).
The Types and Processing of Fibers Are Best Understood, Jul. 25, 2012, pp. 48-49 (total 4 pages).
Stuffing Method, Journal of the Society of Fiber Science and Technology, May 10, 1998, vol. 54, No. 5, pp. 160-165 (total 9 pages).
Basic Knowledge of Technical Fiber and Textiles, Jan. 28, 2011, p. 143, p. 210 (total 3 pages).
Website, Technology and Development, Raw Material, Inorganic Fibers, Sep. 1, 1992, http://www.awapaper.co.jp/technology/material/ (total 7 pages).
Research of Aerosol, Measurements of Airborne Fibrous Particles, vol. 6, No. 1, 1991, pp. 17-24 (total 9 pages).
Clay Science, vol. 9, Nos. 1-2, pp. 10-18, 1969 (total 14 pages).
Clay Science, vol. 32, No. 3, pp. 184-189, 1992 (total 7 pages).
Seni to Kogyo (Fiber and Industry), vol. 52, No. 3, pp. 119-123, 1996 (total 7 pages).
International Search Report (PCT/ISA/210) dated Sep. 28, 2021, issued by the International Searching Authority in counterpart International Application No. PCT/JP2021/025377.
Written Opinion (PCT/ISA/237) dated Sep. 28, 2021, issued by the International Searching Authority in counterpart International Application No. PCT/JP2021/025377.
Osamu Horiuchi, Wet Dehydration and Molding Technology of Heat-resistant and Thermal Insulation Products (Part 2), NICHIAS Technical Report, 2022, vol. 396, No. 1, pp. 12-15 (total 17 pages).
A method of making paper having a high content of inorganic powder, Japan Tappi Journal, 1989, vol. 43, No. 1, pp. 132-136 (total 21 pages).
Moe Fukuoka et al., Development of Mineral Hybrid Fiber from Calcium Carbonate and Pulp Using Fluid-jet Cavitation, Japan Tappi Journal, Nov. 2019, vol. 73, No. 11, pp. 1103-1109 (total 28 pages).
Communication dated Jun. 22, 2024, issued by The State Intellectual Property Office of People's Republic of China in Chinese Application No. 202180004864.9.
Encyclopedia of Chemistry 2, Abridged Edition, 24th Printing, edited by Editorial Board of the Encyclopedia of Chemistry, Sep. 15, 1980, p. 841 (5 total pages), Publisher: Kyoritsu Shuppan Co., Ltd., Tokyo, Japan.
Ceramics Encyclopedia Second Edition, edited by The Ceramic Society of Japan, Mar. 25, 1997, pp. 163-164 (6 total pages), Publisher: Maruzen Co., Ltd., Tokyo, Japan, ISBN: 4-621-04298-X.
Ceramics Encyclopedia Second Edition, edited by The Ceramic Society of Japan, Mar. 25, 1997, p. 202 and p. 571 (6 total pages), Publisher: Maruzen Co., Ltd., Tokyo, Japan, ISBN: 4-621-04298-X.
Noboru Ogawa, English-Japanese Plastic Industry Encyclopedia 5th Edition, 2nd Printing, 1974, p. 83 (5 total pages), Publisher: Kogyo Chosakai Publishing Co., Ltd., Tokyo, Japan, ISBN: 4-7693-4004-4.

\* cited by examiner

HEAT TRANSFER SUPPRESSION SHEET AND BATTERY PACK

TECHNICAL FIELD

The present invention relates to a heat transfer suppression sheet and a battery pack in which the heat transfer suppression sheet is interposed between battery cells.

BACKGROUND ART

In recent years, an electric vehicle, a hybrid vehicle, or the like driven by an electric motor has been actively developed from a viewpoint of environmental protection. A battery pack in which a plurality of battery cells is connected in series or in parallel is mounted on the electric vehicle, the hybrid vehicle, or the like to serve as a power source of a driving electric motor.

A lithium ion secondary battery capable of high capacity and high output as compared with a lead storage battery, a nickel-metal hydride battery, or the like is mainly used as the battery cell. Then, when a thermal runaway occurs in which a certain battery cell rapidly rises in temperature due to an internal short circuit, overcharge, or the like of the battery and then continues to generate heat, the heat from the battery cell in which the thermal runaway occurs may propagate to another adjacent battery cell to cause the thermal runaway of another battery cell.

As a technique for preventing the propagation of heat from the battery cell in which the thermal runaway occurs as described above, a heat transfer suppression sheet is interposed between the battery cells. For example, Patent Literature 1 proposes a heat transfer suppression sheet containing at least one of a mineral powder and a flame retardant, and a matrix resin selected from a thermosetting resin, a thermoplastic elastomer, and a rubber.

CITATION LIST

Patent Literature

Patent Literature 1: JP-A-2018-206605

SUMMARY OF INVENTION

Technical Problem

In such a heat transfer suppression sheet, it is required to satisfactorily retain powder having a heat transfer prevention effect (that is, to prevent powder falling), and to retain a shape and continue to be present between battery cells even when the battery cells are heated to a high temperature due to thermal runaway. In the heat transfer suppression sheet described in Patent Literature 1, a matrix resin is used in order to retain a mineral powder and a flame retardant. However, such a matrix resin is melted at the high temperature. Therefore, in the heat transfer suppression sheet described in Patent Literature 1, the shape may not be retained when the thermal runaway occurs in the battery cell.

Accordingly, an object of the present invention is to provide a heat transfer suppression sheet capable of preventing falling of powder or the like having a heat transfer prevention effect and having excellent shape retainability at a high temperature, and a battery pack in which the heat transfer suppression sheet is interposed between battery cells.

Solution to Problem

The above object is achieved by the heat transfer suppression sheet of the following (1) according to the present invention.

(1) A heat transfer suppression sheet containing:
inorganic particles;
first inorganic fibers; and
second inorganic fibers,
in which an average fiber diameter of the first inorganic fibers is larger than an average fiber diameter of the second inorganic fibers,
the first inorganic fibers have a linear shape or a needle shape, and
the second inorganic fibers have a dendritic shape or a crimped shape.

The heat transfer suppression sheet according to the present invention is preferably (2) to (15) below.

(2) The heat transfer suppression sheet according to (1), in which the average fiber diameter of the first inorganic fibers is 1 µm or more and 20 µm or less, and the average fiber diameter of the second inorganic fibers is 1 nm or more and less than 1 µm.

(3) The heat transfer suppression sheet according to (1) or (2), in which the first inorganic fibers and the second inorganic fibers are the same kind of fibers or a different kind of fibers from each other, and each of the first inorganic fibers and the second inorganic fibers contain at least one selected from silica fibers, alumina fibers, alumina silicate fibers, zirconia fibers, glass fibers, and mineral-based fibers.

(4) The heat transfer suppression sheet according to any one of (1) to (3), in which the first inorganic fibers are glass fibers, and the second inorganic fibers are mineral-based fibers.

(5) The heat transfer suppression sheet according to any one of (1) to (4), in which the inorganic particles have an average secondary particle diameter of 0.01 µm or more and 200 µm or less.

(6) The heat transfer suppression sheet according to any one of (1) to (5), in which the inorganic particles contain at least one selected from oxide particles, carbide particles, nitride particles, and inorganic hydrate particles.

(7) The heat transfer suppression sheet according to (6), in which the inorganic particles contain the oxide particles.

(8) The heat transfer suppression sheet according to (6) or (7), in which the oxide particles have an average primary particle diameter of 0.001 µm or more and 50 µm or less.

(9) The heat transfer suppression sheet according to any one of (6) to (8), in which the oxide particles contain at least one selected from silica, titania, zirconia, zircon, barium titanate, zinc oxide, and alumina.

(10) The heat transfer suppression sheet according to any one of (6) to (9), in which the inorganic particles contain at least one selected from nanoparticles, hollow particles, and porous particles.

(11) The heat transfer suppression sheet according to (9), in which the inorganic particles contain the nanoparticles.

(12) The heat transfer suppression sheet according to any one of (1) to (11), in which the nanoparticles are silica nanoparticles.

(13) The heat transfer suppression sheet according to any one of (1) to (12), in which the inorganic particles contain titania.

(14) The heat transfer suppression sheet according to any one of (10) to (13), in which the nanoparticles have an average primary particle diameter of 1 nm or more and 100 nm or less.

(15) The heat transfer suppression sheet according to any one of (1) to (14), in which, with respect to a total mass of the heat transfer suppression sheet, a content of the inorganic particles is 30 mass % or more and 94 mass % or less, a content of the first inorganic fibers is 3 mass % or more and 30 mass % or less, and a content of the second inorganic fibers is 3 mass % or more and 30 mass % or less.

The object of the present invention is achieved by the configuration of the following (16) related to a battery pack.

(16) A battery pack includes: a plurality of battery cells connected in series or in parallel, in which the heat transfer suppression sheet according to any one of (1) to (15) is interposed between the battery cells.

Advantageous Effects of Invention

Since the heat transfer suppression sheet according to the present invention contains inorganic particles having an excellent heat transfer prevention effect and inorganic fibers, the heat transfer prevention effect is excellent.

In the heat transfer suppression sheet according to the present invention, since the small-diameter second inorganic fibers having the dendritic shape or the crimped shape are entangled with the inorganic particles and the large-diameter first inorganic fibers, the inorganic particles are satisfactorily retained.

Further, unlike a matrix resin, the first inorganic fibers and the second inorganic fibers do not melt at a temperature at the time of thermal runaway of the battery cells, so that the heat transfer suppression sheet according to the present invention can maintain the shape and can continue to be present between the battery cells even when the thermal runaway occurs in the battery cells.

Further, the heat transfer suppression sheet may receive a pressing force due to expansion caused by the thermal runaway of the battery cells or may receive a wind pressure caused by ignition of the battery cells, but the heat transfer suppression sheet according to the present invention can resist these external forces because large-diameter first inorganic fibers entangle with the second inorganic fibers.

In the battery pack according to the present invention, the above-described heat transfer suppression sheet is interposed between the battery cells. Therefore, the battery pack according to the present invention can minimize a damage of the thermal runaway of the battery cell.

DESCRIPTION OF EMBODIMENTS

Hereinafter, an embodiment of a heat transfer suppression sheet and a battery pack according to the present invention will be described in detail with reference to the drawings. The present invention is not limited to the embodiment described below. In the drawings, members and portions having the same functions may be denoted by the same reference numerals, and duplicate descriptions may be omitted or simplified. The embodiment described in the drawings are schematically illustrated for clear explanation of the present invention, and do not necessarily accurately represent actual sizes and scales.

[1. Heat Transfer Suppression Sheet]

Figure 1:
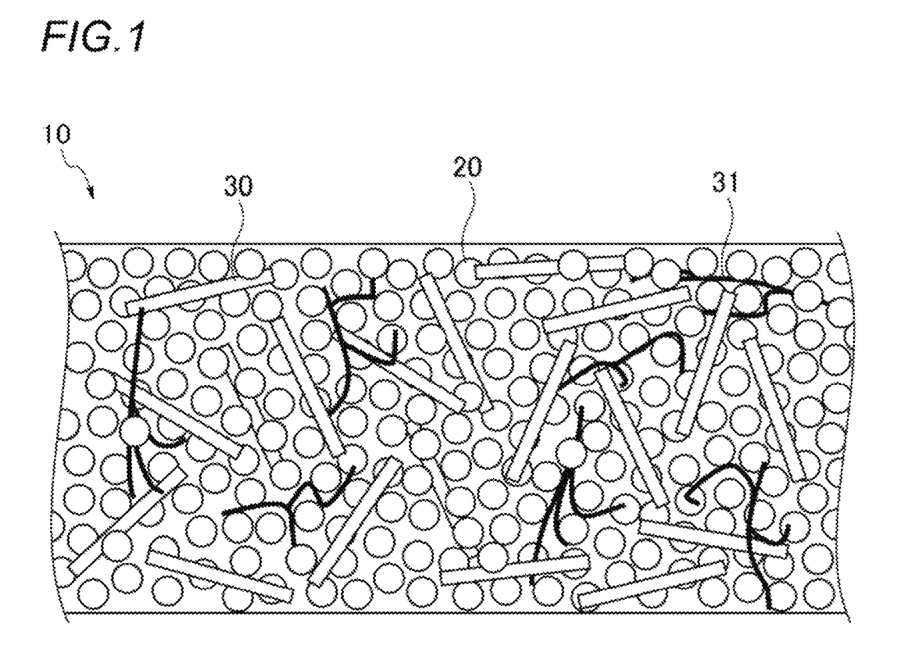
FIG. 1 is a cross-sectional view schematically showing an embodiment of a heat transfer suppression sheet according to the present invention.

FIG. 1 is a cross-sectional view schematically showing an embodiment of a heat transfer suppression sheet according to the present invention. An illustrated heat transfer suppression sheet 10 includes inorganic particles 20, large-diameter first inorganic fibers 30, and small-diameter second inorganic fibers 31. The inorganic particles 20, the first inorganic fibers 30, and the second inorganic fibers 31 are all heat resistant materials, and furthermore, innumerable minute spaces are formed between the particles, between the particles and the fibers, and between the fibers, and a heat insulating effect by air is also exhibited, so that heat transfer prevention performance is excellent.

Hereinafter, the inorganic particles 20, the first inorganic fibers 30, the second inorganic fibers 31, and other compounding materials which constitutes the heat transfer suppression sheet 10, and the thickness of the heat transfer suppression sheet 10 will be described in order.

<1-1. Inorganic Particles>

Although a material of the inorganic particles 20 is not particularly limited, from the viewpoint of the heat transfer prevention effect, the inorganic particles 20 preferably contain at least one selected from oxide particles, carbide particles, nitride particles, and inorganic hydrate particles, and more preferably contain oxide particles.

A shape and a size of the inorganic particles 20 are also not particularly limited. It is preferable that the inorganic particles 20 contain at least one selected from nanoparticles, hollow particles, and porous particles, and it is more preferable that the inorganic particles 20 contain nanoparticles.

As the inorganic particles 20, a single kind of inorganic particles may be used, or two or more kinds of inorganic particles 20 may be used in combination. When two or more kinds of the inorganic particles 20 having different heat transfer prevention effects are used in combination, a heating element can be cooled in multiple stages, and an endothermic effect can be exhibited in a wider temperature range.

It is also preferable to use a mixture of large-diameter particles and small-diameter particles as the inorganic particles 20. When the small-diameter inorganic particles 20 enter gaps between the large diameter inorganic particles 20, a structure becomes denser, and the heat transfer prevention effect can be improved.

When the average secondary particle diameter of the inorganic particles 20 is 0.01 μm or more, it makes the inorganic particles 20 easily available, and an increase in production cost can be prevented. In a case of 200 μm or less, a desired heat insulating effect can be obtained. Therefore, an average secondary particle diameter of the inorganic particles 20 is preferably 0.01 μm or more and 200 μm or less, and more preferably 0.05 μm or more and 100 μm or less.

Next, an example of the material or the shape of particles that can be used as the inorganic particle 20 will be described in detail below.

(1-1-1. Oxide Particles)

Since oxide particles have a high refractive index and a strong effect of diffuse reflection of light, when the oxide particles are used as the inorganic particles, radiant heat transfer can be prevented particularly in a high temperature region such as abnormal heat generation. As the oxide particles, at least one kind selected from silica, titania, zirconia, zircon, barium titanate, zinc oxide, and alumina can be used. That is, among the oxide particles that can be used as inorganic particles, only one kind may be used, or two or more kinds of oxide particles may be used. In particular, silica is a component having high heat insulating property, titania is a component having a refractive index higher than that of other metal oxides, and has a high effect of diffusely reflecting light and blocking radiant heat in a high temperature region of 500° C. or higher. Therefore, it is most preferable to use at least one kind of silica and titania as the oxide particles.

(Average Primary Particle Diameter of Oxide Particles: 0.001 µm or More and 50 µm or Less)

Since a particle diameter of the oxide particles may affect influence of reflecting the radiant heat, when an average primary particle diameter is limited to a predetermined range, higher heat insulating property can be obtained.

That is, when the average primary particle diameter of the oxide particles is 0.001 µm or more, the average primary particle diameter is sufficiently larger than a wavelength of the light contributing to heating, and the light is efficiently diffusely reflected. Therefore, the radiant heat transfer of heat in the heat transfer suppression sheet is prevented in the high temperature region of 500° C. or more, and the heat insulating property can be further improved.

On the other hand, when the average primary particle diameter of the oxide particles is 50 µm or less, contact points and the number between the particles are not increased even when the oxide particles are compressed, and it is difficult to form a path of conductive heat transfer. Therefore, in particular, it is possible to reduce the influence on the heat insulating property in a normal temperature range in which the conductive heat transfer is dominant.

When two or more kinds of oxide particles are used, it is also preferable to use a mixture of the large-diameter particles and the small-diameter particles (nanoparticles). In this case, the average primary particle diameter of the large-diameter particles is more preferably 1 µm or more and 50 µm or less, still more preferably 5 µm or more and 30 µm or less, and most preferably 10 µm or less.

In the present invention, the average primary particle diameter can be determined by observing particles with a microscope, comparing with a standard scale, and averaging any of 10 particles.

(1-1-2. Nanoparticles)

In the present invention, the nanoparticles represent nanometer-order particles having an average primary particle diameter of less than 1 µm which are spherical particles or particles close to the spherical shape. Since the nanoparticles have a low density, conductive heat transfer is prevented, and when the nanoparticles are used as the inorganic particles, voids are further finely dispersed, and thus excellent heat insulating property of preventing convective heat transfer can be obtained.

Therefore, it is preferable to use the nanoparticles from the viewpoint that heat conduction between adjacent nanoparticles can be prevented when a battery in a normal ordinary temperature range is used.

In the present invention, at least one kind of the oxide particles, the carbide particles, the nitride particles, and the inorganic hydrate particles selected as the inorganic particles is preferably the nanoparticles.

Further, when the nanoparticles having a small average primary particle diameter are used as the oxide particles, even when the heat transfer suppression sheet is compressed due to expansion caused by thermal runaway of the battery cell and an internal density increases, an increase in conductive heat transfer of the heat transfer suppression sheet can be prevented. It is considered that this is because nanoparticles form fine voids easily between the particles due to a repulsive force caused by static electricity, and a bulk density is low, and thus the particles are filled so as to have cushioning properties.

In the present invention, when the nanoparticles are used as the inorganic particles, the material is not particularly limited as long as the material conforms to the definition of the nanoparticles as described above. For example, since the silica nanoparticles are a material having high heat insulating property and have small contact points between the particles, an amount of heat conducted by the silica nanoparticles is smaller than that in the case where silica particles having a large particle diameter are used. Since the generally available silica nanoparticles have a bulk density of about 0.1 g/cm$^3$, for example, even when the battery cells disposed on both sides of a heat insulation sheet thermally expand and a large compressive stress is applied to the heat insulation sheet, a size (area) and the number of contact points between the silica nanoparticles do not significantly increase, and the heat insulating property can be maintained. Therefore, the silica nanoparticles are preferably used as the nanoparticles. As the silica nanoparticles, wet silica, dry silica, aerogel, and the like can be used.

In the present invention, at least one kind of the oxide particles, the carbide particles, the nitride particles, and the inorganic hydrate particles selected as the inorganic particles is preferably the nanoparticles. As described above, titania has a high effect of blocking radiant heat, the silica nanoparticles have extremely small conductive heat transfer, and can maintain excellent heat insulating property even when the compressive stress is applied to the heat insulation sheet. Therefore, it is most preferable to use both titania and silica nanoparticles as the inorganic particles.

(Average Primary Particle Diameter of Nanoparticles: 1 nm or More and 100 nm or Less)

When the average primary particle diameter of the nanoparticles is limited to a predetermined range, even higher heat insulating property can be obtained.

That is, when the average primary particle diameter of the nanoparticles is 1 nm or more and 100 nm or less, the convection heat transfer and conductive heat transfer of heat in the heat transfer suppression sheet can be prevented particularly in a temperature range of less than 500° C., and the heat insulation property can be further improved. Even when the compressive stress is applied, the voids remaining between the nanoparticles and the contact points between many particles can prevent the conductive heat transfer, and the heat insulating property of the heat transfer suppression sheet can be maintained.

The average primary particle diameter of the nanoparticles is more preferably 2 nm or more, and still more preferably 3 nm or more. On the other hand, the average primary particle diameter of the nanoparticles is more preferably 50 nm or less, and still more preferably 10 nm or less.

(1-1-3. Inorganic Hydrate Particles)

The inorganic hydrate particles are thermally decomposed at equal to or higher than the thermal decomposition initiation temperature by receiving heat from a beating element, and release crystal water possessed by the inorganic hydrate particles to lower the temperature of the heating element and surroundings thereof, that is, exhibit a so-called "endothermic effect". In addition, after the crystal water is released, a porous body is formed, and a heat insulating effect is exhibited by a large number of air holes.

Specific examples of the inorganic hydrate include aluminum hydroxide ($Al(OH)_3$), magnesium hydroxide ($Mg(OH)_2$), calcium hydroxide ($Ca(OH)_2$), zinc hydroxide ($Zn(OH)_2$), iron hydroxide ($Fe(OH)_2$), manganese hydroxide ($Mn(OH)_2$), zirconium hydroxide ($Zr(OH)_2$), and gallium hydroxide ($Ga(OH)_3$).

For example, aluminum hydroxide has about 35% of crystal water. As shown in the following formula, the aluminum hydroxide is thermally decomposed to release the crystal water, thereby exhibiting the endothermic effect. After the crystal water is discharged, alumina ($Al_2O_3$) which is the porous body is formed, and it functions as a heat insulator.

$$2Al(OH)_3 \rightarrow Al_2O_3 + 3H_2O$$

As described later, in the battery pack according to the present invention, the heat transfer suppression sheet 10 is interposed between the battery cells, and the battery cell at which the thermal runaway occurs rapidly rises to a temperature exceeding 200° C., and continues to rise to around 700° C. Therefore, the inorganic particles preferably contain an inorganic hydrate having a thermal decomposition initiation temperature of 200° C. or higher.

The thermal decomposition initiation temperature of the inorganic hydrate described above is about 200° C. for aluminum hydroxide, about 330° C. for magnesium hydroxide, about 580° C. for calcium hydroxide, about 200° C. for zinc hydroxide, about 350° C. for iron hydroxide, about 300° C. for manganese hydroxide, about 300° C. for zirconium hydroxide, and about 300° C. for gallium hydroxide. All of the hydrates are preferably inorganic hydrates since the temperature substantially overlaps with a temperature range of a rapid temperature rise of the battery cell in which the thermal runaway occurs and can efficiently prevent the temperature rise.

When the inorganic hydrate particles are used as the inorganic particles 20, if the average particle diameter thereof is too large, a certain amount of time is required for the inorganic particles 20 (inorganic hydrate) in the vicinity of a center of the heat transfer suppression sheet 10 to reach the thermal decomposition temperature thereof, and thus the inorganic particles 20 in the vicinity of the center of the sheet may not be completely thermally decomposed. Therefore, the average secondary particle diameter of the inorganic hydrate particles is preferably 0.01 μm or more and 200 μm or less, and more preferably 0.05 μm or more and 100 μm or less.

<1-2. First Inorganic Fiber>

The average fiber diameter of the first inorganic fiber 30 is set to be larger than the average fiber diameter of the second inorganic fiber 31. By using large-diameter fibers having a linear shape or a needle shape as the first inorganic fibers 30, it is possible to improve the mechanical strength and shape retainability against pressure and wind pressure from the battery cells of the heat transfer suppression sheet 10. Impact from the outside may act on the heat transfer suppression sheet 10, and the impact resistance can be increased by including the large-diameter first inorganic fibers 30. The impact from the outside is, for example, a pressing force due to expansion of the battery cell, or a wind pressure due to ignition of the battery cell. The linear shape or the needle shape fiber means a fiber having a crimp degree described later of, for example, less than 10%, preferably 5% or less.

In order to exhibit such effect, the average fiber diameter of the first inorganic fibers 30 is preferably 1 μm or more, and more preferably 3 μm or more. However, if the first inorganic fibers 30 are too thick, since the moldability and processability into the heat transfer suppression sheet 10 may be reduced, it is preferably 20 μm or less, and more preferably 15 μm or less.

If the first inorganic fibers 30 are too long, the moldability and the processability may be reduced. Therefore, a fiber length is preferably 100 mm or less. Further, if the first inorganic fibers 30 are too short, since the shape retainability and the mechanical strength are reduced, the fiber length is preferably 0.1 mm or more.

<1-3. Second Inorganic Fiber>

The second inorganic fibers 31 have a smaller diameter than the first inorganic fibers 30. The shape of the second inorganic fibers is a dendritic shape or a crimped shape. By setting the second inorganic fibers 31 to the dendritic shape or the crimped shape, the second inorganic fibers 31 are easily deformed and have flexibility. Therefore, the second inorganic fibers 31 are complicatedly entangled with the first inorganic fibers 30 and the inorganic particles 20, and the retention performance of the inorganic particles 20 is enhanced.

Since the first inorganic fibers 30 are entangled with the second inorganic fibers 31, the heat transfer suppression sheet is prevented from slipping and moving or changing an angle when the heat transfer suppression sheet receives the pressing force or the wind pressure. Accordingly, an effect of resisting the pressing force and an impact from the outside is particularly exerted.

The dendritic shape is a two-dimensionally or three-dimensionally branched structure, for example, a feather-like shape, a tetrapot shape, a radial shape, or a three-dimensional mesh-like shape.

The crimped shape is a structure in which fibers are bent in various directions. As one of methods for quantifying the crimped form, it is known to calculate the crimp degree from an electron micrograph, and the crimp degree can be calculated from, for example, the following formula.

Crimp degree (%)=(fiber length−distance between the ends of the fiber)/(fiber length)×100

Here, both the fiber length and the distance between the ends of the fiber are measurement values on the electron micrograph. That is, these are the fiber length and the distance between the ends of the fiber under projection onto a two-dimensional plane, and are shorter than actual values. Based on the formula, the crimp degree of the second inorganic fibers 31 is preferably 10% or more, and more preferably 30% or more. When the crimp degree is small, the ability to retain the inorganic particles 20, the entanglement (network) between the second inorganic fibers 31, or with the first inorganic fibers 30 is less likely to be formed.

In order to exhibit such an effect, the average fiber diameter of the second inorganic fibers 31 is preferably less than 1 μm, and more preferably 0.1 μm or less. However, if the second inorganic fibers 31 are too thin, the fibers are easily broken, and an ability to retain the inorganic particles 20 is reduced. In addition, a proportion of the fibers present in the sheet in an entangled state without retaining the inorganic particles 20 increases, and in addition to a reduction in the ability to retain the inorganic particles 20, the moldability and the shape retainability are also deteriorated. Therefore, the average fiber diameter of the second inorganic fibers 31 is preferably 1 nm or more, and more preferably 10 nm or more. When the second inorganic fibers 31 are the dendritic shape, the average fiber diameter thereof can be obtained by measuring the diameters of a trunk portion and a branch portion at several points by SEM and calculating an average value thereof.

Further, if the second inorganic fiber 31 is too long, because the moldability and the shape retainability are reduced, the fiber length is preferably 0.1 mm or less.

<1-4. Kinds of Inorganic Fibers>

Both the first inorganic fibers 30 and the second inorganic fibers 31 are preferably excellent in heat resistance. Examples thereof include ceramic-based fibers such as silica fibers, alumina fibers, alumina silicate fibers, and zirconia fibers, and glass fibers. As the first inorganic fibers 30 and the second inorganic fibers 31, the above-described inorganic fibers may be used alone, or two or more kinds thereof may be used in combination. The first inorganic fibers 30 and the second inorganic fibers 31 may be the same kind of fibers or may be a different kind of fibers from each other. In particular, glass fibers are preferably used as the first inorganic fibers 30. At least one of glass fibers, silica fibers, and mineral-based fibers are preferably used as the second inorganic fibers 31, and mineral-based fibers are more preferably used.

One of the first inorganic fiber 30 and the second inorganic fiber 31 is an amorphous fiber, and the other preferably contains at least one selected from an amorphous fiber having a glass transition point higher than that of the one fiber and a crystalline fiber. In such a case, when the heat transfer suppression sheet is exposed to a high temperature, the surface of one of the inorganic fibers is softened relatively early, and binds the other inorganic fiber and the inorganic particles 20, so that the mechanical strength is improved.

However, it is more preferable that the first inorganic fibers 30 having the large average fiber diameter are amorphous fibers, and the second inorganic fibers 31 having the smaller average fiber diameter than the first inorganic fibers 30 are fibers containing at least one selected from the amorphous fibers having a higher glass transition point than the first inorganic fibers 30 and the crystalline fibers.

<1-5. Contents of Inorganic Particles, First Inorganic Fibers, and Second Inorganic Fibers>

A content of the inorganic particles 20 is preferably 30 mass % or more and 94 mass % or less with respect to the total mass of the heat transfer suppression sheet 10, the content of the first inorganic fibers 30 is preferably 3 mass % or more and 30 mass % or less with respect to the total mass of the heat transfer suppression sheet 10, and the content of the second inorganic fibers 31 is preferably 3 mass % or more and 30 mass % or less with respect to the total mass of the heat transfer suppression sheet 10.

More preferably, the content of the inorganic particles 20 is 60 mass % or more and 90 mass % or less, the content of the first inorganic fibers 30 is 5 mass % or more and 15 mass % or less, and the content of the second inorganic fibers 31 is 5 mass % or more and 15 mass % or less, with respect to the total mass of the heat transfer suppression sheet 10. By setting such a content, heat absorption and heat insulating effect by the inorganic particles 20, the shape retainability, pressing force resistance, and wind pressure resistance by the first inorganic fibers 30, and the ability of the second inorganic fibers 31 to retain the inorganic particles 20 are exhibited in a well-balanced manner.

<1-6. Other Blending Materials>

An organic fiber, an organic binder, or the like may be blended in the heat transfer suppression sheet 10 as necessary. All of these are useful for the purpose of reinforcing the heat transfer suppression sheet 10 and improving the moldability, and these are preferably contained 10 mass % or less with respect to the total mass of the heat transfer suppression sheet.

The kinds of the organic fibers, the organic binder, and the like to be used are not particularly limited, and examples of the organic fibers include pulp fibers and polyester fibers. As the organic binder, a preferable binder can be selected according to a production method. The organic binder that can be selected in the present invention will be described later.

<1-7. Thickness of Heat Transfer Suppression Sheet>

The thickness of the heat transfer suppression sheet 10 is not particularly limited, and is preferably 0.05 mm or more and 5 mm or less. When the thickness is less than 0.05 mm, sufficient mechanical strength cannot be imparted to the heat transfer suppression sheet 10. On the other hand, when the thickness is more than 5 mm, the heat transfer suppression sheet 10 may be difficult to form.

[2. Production Method of Heat Transfer Suppression Sheet]

The heat transfer suppression sheet 10 is produced by molding a material including at least the inorganic particles 20, the first inorganic fibers 30, and the second inorganic fibers 31 by a dry molding method or a wet molding method. As the dry molding method, for example, a press molding method (dry press molding method) and an extrusion molding method (dry extrusion molding method) can be used.

<2-1. Production Method Using Dry Press Molding Method>

In the dry press molding method, the inorganic particles 20, the first inorganic fibers 30, the second inorganic fibers 31, and if necessary, the organic fibers, the organic binder, and the like are put into a mixer such as a V-type mixer at a predetermined proportion. Then, after the materials put into the mixer are sufficiently mixed, a mixture is put into a predetermined mold and press-molded, so that the heat transfer suppression sheet 10 can be obtained. At the time of press forming, heating may be performed as necessary.

A press pressure during press forming is preferably in a range of 0.98 MPa or more and 9.80 MPa or less. When the press pressure is less than 0.98 MPa, the strength of the heat transfer suppression sheet 10 to be obtained may not be maintained, and the heat transfer suppression sheet 10 may collapse. On the other hand, when the press pressure is more than 9.80 MPa, the processability may be reduced due to excessive compression, or solid heat transfer may increase due to an increase in the bulk density, and the heat insulating property may be reduced.

When using the dry press molding method, polyvinyl alcohol (PVA) is preferably used as the organic binder, whereas the organic binder is not particularly limited as long as it is an organic binder generally used when using the dry press molding method.

<2-2. Production Method Using Dry Extrusion Molding Method>

In the dry extrusion molding method, water is added to the inorganic particles 20, the first inorganic fibers 30, the second inorganic fibers 31, and if necessary, the organic fibers, the organic binder, and the like which are a binder, and the mixture is kneaded by a kneader to prepare a paste.

Thereafter, the obtained paste is extruded from a slit-shaped nozzle using an extrusion molding machine, and further dried, so that the heat transfer suppression sheet 10 can be obtained. When using the dry extrusion molding method, methyl cellulose, water-soluble cellulose ether, and the like are preferably used as the organic binder, whereas the organic binder is not particularly limited as long as it is an organic binder generally used when using the dry extrusion molding method.

Figure 2:
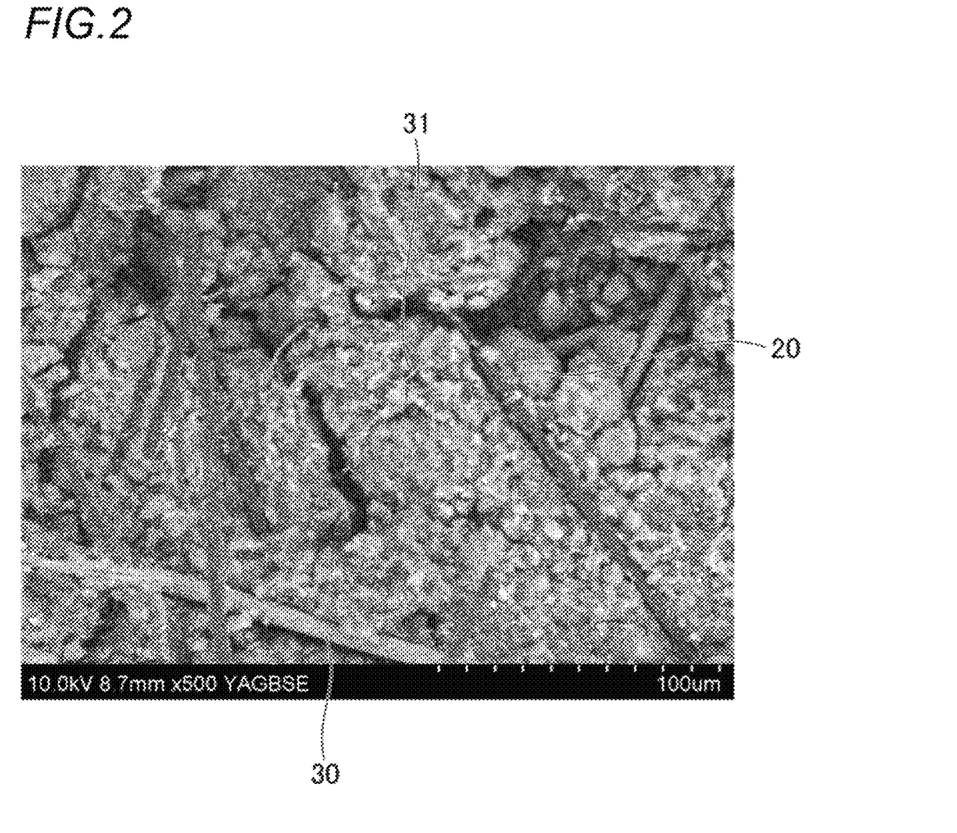
FIG. 2 is an SEM photograph showing a cross section of the heat transfer suppression sheet according to the embodiment of the present invention produced by a dry extrusion molding method.

FIG. 2 is an SEM photograph showing a cross section of the heat transfer suppression sheet according to the embodiment of the present invention produced by the dry extrusion molding method. As shown in FIG. 2, the heat transfer suppression sheet includes the inorganic particles 20, the large-diameter first inorganic fibers 30, and the small-diameter second inorganic fibers 31. Numerous minute spaces are formed between the inorganic particles 20, between the inorganic particles 20 and the inorganic fibers 30 and 31, and between the inorganic fibers 30 and 31, and the heat insulating effect by air is also exhibited, so that the heat transfer prevention performance is excellent.

<2-3. Production Method Using Wet Molding Method>

In the wet molding method, the inorganic particles 20, the first inorganic fibers 30, the second inorganic fibers 31, and if necessary, the organic binder as the binder are mixed in water, and the mixture is stirred with a stirrer to prepare a mixed liquid. Thereafter, the obtained mixed liquid is poured into a molding machine in which a filtration mesh is formed at a bottom surface, and the mixed liquid is dehydrated through the mesh to prepare a wet sheet. Thereafter, the obtained wet sheet is heated and pressurized, so that the heat transfer suppression sheet 10 can be obtained.

Prior to a heating and pressurizing step, a ventilation drying treatment in which hot air is passed through the wet sheet to dry the sheet may be performed, whereas the wet sheet may be heated and pressurized in a wet state without performing the ventilation drying treatment.

When the wet molding method is used, cationic starch or an acrylic resin can be selected as the organic binder.

[3. Battery Pack]

Figure 3:
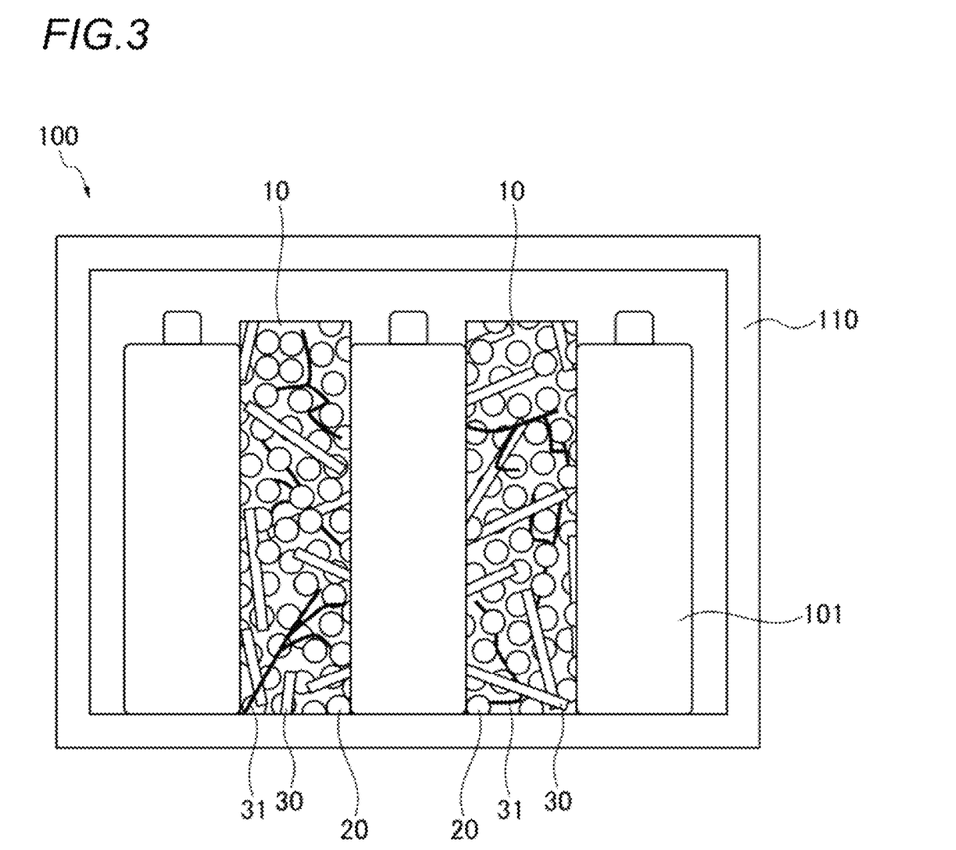
FIG. 3 is a cross-sectional view schematically showing an embodiment of a battery pack according to the present invention.

In the battery pack according to the present invention, the heat transfer suppression sheet 10 is interposed between the battery cells. Specifically, as shown in FIG. 3, a battery pack 100 includes a plurality of battery cells 101 arranged side by side, connected in series or in parallel, and accommodated in a battery case 110, and the heat transfer suppression sheet 10 is interposed between the battery cells 101.

In such a battery pack 100, even when one battery cell 101 is thermally runaway to reach a high temperature, and expands or ignites, the influence on adjacent other battery cell 101 is prevented by the heat transfer suppression sheet 10 excellent in the heat transfer prevention effect, the shape retainability at high temperature, an anti-pressing property, and the wind pressure resistance. Therefore, in the battery pack according to the present invention, a chain of the thermal runaway of the battery cells is prevented, and even if the thermal runaway occurs in one battery cell 101, damage is reduced to the minimum.

Although various embodiments are described above with reference to the drawings, it goes without saying that the present invention is not limited to such examples. It is apparent to those skilled in the art that various changes and modifications can be conceived within the scope of the claims, and it is also understood that such variations and modifications belong to the technical scope of the present invention. In addition, constituent elements in the embodiments described above may be combined freely within a range not departing from the spirit of the present invention.

The present application is based on a Japanese patent application (No. 2020-119429) filed on Jul. 10, 2020, contents of which are incorporated herein by reference.

REFERENCE SIGNS LIST 10 heat transfer suppression sheet
20 inorganic particles
30 first inorganic fibers
31 second inorganic fibers
100 battery pack
110 battery case

The invention claimed is:

1. A heat transfer suppression sheet comprising:
inorganic particles,
first inorganic fibers, and
second inorganic fibers,
wherein an average fiber diameter of the first inorganic fibers is larger than an average fiber diameter of the second inorganic fibers,
the first inorganic fibers have a linear shape or a needle shape, and
the second inorganic fibers have a dendritic shape or a crimped shape.

2. The heat transfer suppression sheet according to claim 1,
wherein the average fiber diameter of the first inorganic fibers is 1 μm or more and 20 μm or less, and
the average fiber diameter of the second inorganic fibers is 1 nm or more and less than 1 μm.

3. The heat transfer suppression sheet according to claim 1,
wherein the first inorganic fibers and the second inorganic fibers are the same kind of fibers or a different kind of fibers from each other, and
each of the first inorganic fibers and the second inorganic fibers contain at least one selected from silica fibers, alumina fibers, alumina silicate fibers, zirconia fibers, glass fibers, and mineral-based fibers.

4. The heat transfer suppression sheet according to claim 2,
wherein the first inorganic fibers and the second inorganic fibers are the same kind of fibers or a different kind of fibers from each other, and
each of the first inorganic fibers and the second inorganic fibers contain at least one selected from silica fibers, alumina fibers, alumina silicate fibers, zirconia fibers, glass fibers, and mineral-based fibers.

5. The heat transfer suppression sheet according to claim 1, wherein the first inorganic fibers are glass fibers, and
the second inorganic fibers are mineral-based fibers.

6. The heat transfer suppression sheet according to claim 1,
wherein the inorganic particles have an average secondary particle diameter of 0.01 μm or more and 200 μm or less.

7. The heat transfer suppression sheet according to claim 2,
wherein the inorganic particles have an average secondary particle diameter of 0.01 μm or more and 200 μm or less.

8. The heat transfer suppression sheet according to claim 3,
wherein the inorganic particles have an average secondary particle diameter of 0.01 μm or more and 200 μm or less.

9. The heat transfer suppression sheet according to claim 4,
wherein the inorganic particles have an average secondary particle diameter of 0.01 μm or more and 200 μm or less.

10. The heat transfer suppression sheet according to claim 1, wherein the inorganic particles contain at least one selected from oxide particles, carbide particles, nitride particles, and inorganic hydrate particles.

11. The heat transfer suppression sheet according to claim 10,
wherein the inorganic particles contain the oxide particles.

12. The heat transfer suppression sheet according to claim 11,
wherein the oxide particles have an average primary particle diameter of 0.001 μm or more and 50 μm or less.

13. The heat transfer suppression sheet according to claim 10, wherein the oxide particles contain at least one selected from silica, titania, zirconia, zircon, barium titanate, zinc oxide, and alumina.

14. The heat transfer suppression sheet according to claim 10, wherein the inorganic particles contain at least one selected from nanoparticles, hollow particles, and porous particles.

15. The heat transfer suppression sheet according to claim 14,
wherein the inorganic particles contain the nanoparticles.

16. The heat transfer suppression sheet according to claim 14,
wherein the nanoparticles are silica nanoparticles.

17. The heat transfer suppression sheet according to claim 14, wherein the nanoparticles have an average primary particle diameter of 1 nm or more and 100 nm or less.

18. The heat transfer suppression sheet according to claim 13, wherein the oxide particles contain titania.

19. The heat transfer suppression sheet according to claim 1, wherein with respect to a total mass of the heat transfer suppression sheet,
a content of the inorganic particles is 30 mass % or more and 94 mass % or less,
a content of the first inorganic fibers is 3 mass % or more and 30 mass % or less, and
a content of the second inorganic fibers is 3 mass % or more and 30 mass % or less.

20. A battery pack comprising a plurality of battery cells connected in series or in parallel, wherein the heat transfer suppression sheet according to claim 1 is interposed between the battery cells.

* * * * *